United States Patent [19]
Gurganus et al.

[11] Patent Number: 6,011,108
[45] Date of Patent: Jan. 4, 2000

[54] LOW MAR GASKET COMPOSITION AND METHOD OF MAKING SAME

[75] Inventors: Cecil R. Gurganus, Evansville; Roy C. Sanford, Dale; Francis L. Horning, Evansville, all of Ind.

[73] Assignee: Ilpea, Inc., Fort Smith, Ariz.

[21] Appl. No.: 07/928,071

[22] Filed: Aug. 12, 1992

Related U.S. Application Data

[63] Continuation of application No. 07/559,125, Jul. 26, 1990, abandoned.

[51] Int. Cl.[7] .......................................................... C08J 9/02
[52] U.S. Cl. ............................................ 524/569; 524/311
[58] Field of Search ...................................... 524/569, 311

[56] References Cited

U.S. PATENT DOCUMENTS

| | | | |
|---|---|---|---|
| 4,670,490 | 6/1987 | Yoshida et al. | 525/227 |
| 5,137,960 | 8/1992 | Matsumoto et al. | 524/569 |

*Primary Examiner*—Peter D. Mulcahy
*Attorney, Agent, or Firm*—Calfee, Halter & Griswold

[57] ABSTRACT

A gasketing compound with low plasticizer migration comprises a polyvinyl chloride resin with an inherent viscosity at or above about 0.92 and a porosity at or above 24 cubic centimeters per gram, and a polymeric plasticizer. The gasketing compound is extruded to form a gasket which produces little or no marring of the paint surface with which the gasket is in contact.

13 Claims, No Drawings

LOW MAR GASKET COMPOSITION AND METHOD OF MAKING SAME

This is a continuation of copending application Ser. No. 07/559,125 filed on Jul. 26, 1990 now abandoned.

BACKGROUND OF THE INVENTION

Flexible polyvinyl chloride compounds have many applications in sealing and gasketing. Such compounds are, for example, used to form the gaskets which seal refrigerator and freezer doors. The flexible polyvinyl chloride compounds used to seal refrigerator and freezer doors must be compatible with the surfaces with which they will come in contact. The gasketing compound must not change the properties of the in-contact surface, or mar or otherwise alter the appearance of the in-contact surface and especially not stick, soften the paint, nor cause the paint to adhere to the gasket.

Manufacturers of refrigerators and freezers desire to use pre-painted steel in fabricating their products. Such repainted steel is subjected to forming operations which produces sharp bend radii in the paint layer as the steel is formed into the desired shape. Small cracks (micro-cracks) in the painted surface may develop in the vicinity of the sharp bend radii. Upon exposure to the environment, these micro-cracks begin to rust and produce a surface mottled with rust and streaks of rust.

To address this micro-crack phenomenon, paint manufacturers produced "softer" paints which allow the paint film to stretch around the sharp bends and maintain a continuous painted surface. Such "softer" paints which eliminated the microcracking phenomenon demonstrated incompatibility with existing gasket compositions. This invention teaches the composition of a novel flexible polyvinyl chloride gasketing material with low plasticizer migration and the process employed to form such gaskets. These gaskets significantly reduce the marring of the pre-painted surface which they contact.

SUMMARY OF THE INVENTION

A gasketing compound with low plasticizer migration is comprised of polyvinyl chloride resin and a flexibilizing polymer plasticizer. The polyvinyl chloride resin which comprises the gasketing compound of the present invention has an inherent viscosity at or above 0.92 and a porosity at or above 24 cubic centimeters per gram. Polyvinyl chloride resin with an inherent viscosity below about 0.92 and a porosity below about 24 cubic centimeters per gram will not produce the gasketing compounds of the present invention which exhibit low plasticizer migration and the resulting low marring effect on pre-painted surfaces. The polyvinyl chloride compound is pelletized with a polymer plasticizer, such as nitrile rubber, Hytrel, ethylvinyl acetate, Dupont Elvaloy, or a polymeric polyester plasticizer. The pelletized compound must be produced under operating conditions which produce pellets without surface defects, inconsistency of pellet size and inconsistent physical properties. Pelletized compounds which contain unplasticized polyvinyl chloride resin and unabsorbed plasticizer will result in compounds outside the scope of the present invention which will increase marring properties and exhibit other unacceptable surface conditions when extruded into gaskets. Processing aids may be added to the gasketing compound of the present invention prior to the pelletizing. The pelletized gasket composition is then extruded to form a gasket. The gasket must be produced under extrusion condition which produce an extruded profile without overfluxed material, with acceptable cross section dimensions, and without low physical property characteristics.

DETAILED DESCRIPTION OF THE INVENTION

This invention is a gasketing compound with low plasticizer migration which, when processed into a gasket which may be used on refrigerators and freezers, significantly reduces or eliminates the marring of the pre-painted contact surface. The flexible gasketing compound comprises a polyvinyl chloride resin and a polymer plasticizer. The gasketing compound is pelletized, or alternatively, powder dry-blended. The gasketing compound whether pelletized or alternatively powder dry-blended is then extruded into a profile which may be used to make a gasket to seal refrigerator and freezer doors and which eliminates or significantly reduces marring.

Gasket compositions may be ranked by their effect in producing a marring of the pre-painted contact surface using a proprietary test procedure (Procedure I) designed to accelerate the marring phenomenon. The gasket compositions of the present invention were tested according to the following two procedures. In Procedure I, the gasket composition is put into contact with a pre-painted test panel at a contact pressure of 0.05 to 0.065 pounds per square inch and continuously subjected to a temperature of 158° F.±2° F. for 42 days. In Procedure II, the gasket composition is put in contact with a pre-painted test panel at a contact pressure of 0.05 to 0.065 pounds per square inch and continuously subjected to 110° F. and 100% humidity for 42 days. The panels were then rated on a scale of 0 to 10, with 0 representing no improvement in marring over gasket composition and 10 representing the absence of any marring.

The polyvinyl chloride resin comprising the gasketing compound has an inherent viscosity at or above about 0.92. Inherent viscosity is an indirect measurement of the molecular weight of the polyvinyl chloride resin. The polyvinyl chloride resin comprising the gasketing compound of the present invention also has a porosity at or above 24 cubic centimeter per gram. Experimental results using Procedure I, shown in Table I demonstrate that as the inherent viscosity and the porosity of the polyvinyl chloride resin increases and other composition parameters are held constant in the gasket composition, the marring of the contact surface by the gasket is decreased.

Polyvinyl chloride resins of different inherent viscosities may be blended together to produce a composite which, when processed into the gasket composition of the present invention, produces gasket compositions exhibiting increased resistance to mar of pre-painted surfaces. As Table II demonstrates, the polyvinyl chloride resin with the greatest average inherent viscosity produces a gasket composition with the greatest resistance to marring.

The polyvinyl chloride containing resin used to produce the gasket compositions of the present invention may be a copolymer or a terpolymer. For example, vinyl chloride monomer co-polymerized with vinyl acetate has an increased porosity at a substantially similar inherent viscosity which produces a gasket composition with improved mar resistance.

Polymer plasticizers having low taste and odor, together with the polyvinyl chloride resin, comprise the gasket composition of the invention. Polymer plasticizers include nitrile rubbers, ethylene vinyl acetate, urethanes, polyesters and other polymers which will plasticize polyvinyl chloride.

Table III demonstrates the results of a number of polymer plasticizers on mar resistance. Polymer polyester plasticizers formed from adipic acid and propylene glycol having a molecular weight of about 5000 grams per mole provide improved mar resistance in the gasket composition. Polymer polyester plasticizers formed from adipic or glutaric acid and 1,3-butylene glycol having a molecular weight from about 1500 to about 2000 produces a gasket composition of the present invention with increased resistance to marring. The preferred polymer plasticizer is a polyester formed from adipic acid and neopentyl glycol having a molecular weight from about 1500 to about 2000. Higher molecular weight polyester plasticizers impart further resistance to marring to the gasket composition. The gasket compound of the invention includes polymer plasticizer in an amount up to 80 parts per hundred parts of polyvinyl chloride or polyvinyl chloride copolymer resin.

Processing aids may be added to the composition to aid in processing of the gasket composition. Commercially available processing aids such as stearic acid, Allied Chemical Company's AC-1702 and AC-6A and Kenrich L-38 do not affect the mar resistance of the gasket composition when employed at levels commonly used by those skilled in the art. Table IV lists processing aids, their use levels, and their effect on marring pre-painted surfaces by the gasket compound in which they are formulated. As Table IV demonstrates, Dupont's Elvaloy 742 and U.S.I.'s ethylene vinyl acetate produce a gasket composition with improved resistance to marring.

The gasket composition comprised of the polyvinyl chloride resin and the polymer plasticizer may be powder dry blended prior to extrusion. Powder dry blending may be accomplished by mixing the composition in a high intensity mixer. In a Henschel-type high intensity mixer, the plasticizer temperature prior to blending is preferably in the range of from about 120° F. and 140° F. and the resin temperature prior to blending is preferably between about 110° F. and about 150° F. Total mixing time for the powder dry blending is preferably from about eight to about twelve minutes.

Alternatively, the composition may be pelletized prior to extrusion. Pelletizing may be accomplished in any pelletizer under parameters which result in pellets, which, when extruded, exhibit improved resistance to marring. The process of pelletizing is one in which the parameters employed in the process influence the properties of the final extruded gasketing compound. Generally, the variables of the twin-screw pelletizer may span a range of specifications which will yield extruded gasketing compounds having increased resistance to marring. Pelletizing is preferably accomplished in a twin screen pelletizer, such as a Werner Pfleiderer Kombi-Plast Model KP-800. The temperature in the first zone of the pelletizer is preferably from about 200° F. to about 260° F. The temperature in the second zone is preferably from about 200° F. to about 260° F. The temperature in the third zone is preferably from about 200° F. to about 260° F. The temperature in the fourth zone is preferably from about 160° F. to about 220° F. The torque is preferably from about 40% to about 80%. The screw speed is preferably from about 140 revolutions per minute (rpm) to about 200 rpm. The melt temperature is preferably from about 280° F. to about 350° F. The output is preferably from about 1200 pounds per hour to about 2000 pounds per hour. The dry-blend compound temperature is preferably from about 100° F. to about 220° F. As the inherent viscosity of the polyvinyl chloride resin increases, the melt temperature of the compound must be increased to produce pellets which, when extruded, provide increased resistance to marring of pre-painted surfaces.

After pelletizing or powder dry blending, the gasket composition may be extruded into extruded profile lengths subsequently cut to the desired length, the magnetic strip added and the lengths joined at the mitered ends to produce the desired gasket for use in refrigerators and freezers. Extrusion may be accomplished under any set of parameters which produces a gasket compound which exhibits increased resistance to marring. The preferred extrusion profile for pelletized gasket compositions of the present invention is carried out on a 3.5 inch diameter, 24:1 length-to-diameter ratio, single screw National Rubber Machinery Corporation Extruder, employing the parameters within the preferred ranges. The preferred temperature range in the first zone is from about 240° F. to about 310° F. The preferred range in the second zone is from about 240° F. to about 320° F. The preferred temperature range in the third zone is from about 240° to about 320° F. The preferred temperature range in the fourth zone is from about 240° F. to about 310° F. The preferred temperature range in the fifth zone is from about 240° F. to about 305° F. The preferred range in the sixth zone is from about 240° F. to about 290° F. The preferred temperature range in the seventh zone is from about 260° F. to about 280° F. The preferred temperature range in the eighth zone is from about 260° F. to about 280° F. The preferred melt temperature is from about 280° F. to about 350° F. The preferred screw speed is from about 30 rpm to about 50 rpm. The preferred mesh screen pack is 1(20), 2(40's), and 2(80's). The preferred barrel pressure is from about 900 pounds per square inch (psi) to about 1500 psi at the sixth zone. The preferred output is from about 200 pounds per hour to about 350 pounds per hour. The preferred line speed is from about 30 feet per minute to about 70 feet per minute.

The following examples illustrate the present invention, but are not intended to limit the claims in any manner whatsoever.

EXAMPLES

Example I a. Compounding Process

The following raw materials were weighed and mixed in a high intensity (Henschel) mixer.

| Raw Materials | Parts per Hundred Resin |
| --- | --- |
| Geon 31 PVC resin | 75.00 |
| Geon 3400 PVC resin | 25.00 |
| Epoxidized Soybean Oil Union Carbide | 16.77 |
| Huls 910 Polymeric Plasticizer | 67.18 |
| English Clay Calcium Carbonate | 50.00 |
| Witco Zinc Complex Stabilizer | 1.50 |
| Morton Thiokol Fungicide (SB-1) | 1.45 |
| Color Pigments | 5.53 |
| | 242.43 |

Plasticizers (Huls 910 and Union Carbide ESO) were pre-heated to 140° F. Resins and stabilizers were added to mixer. Mixer's blades were turned on low speed. After 1 minute mixing, the pre-heated plasticizers were slowly added to the mixer. After all plasticizers were added, the mixer blade speed was changed from low to high speed. Raw materials were mixed until batch temperature reached 160° F. Pigments and fungicides were added to mixer with blades still on high speed. When the batch temperature reached 200° F. the blade speed was reduced to low. The compound was mixed for 3 minutes on low speed. The speed of the blade was then changed to high. Calcium carbonate filler was added and compound batch was mixed until a 220° F. temperature achieved.

The batch (powder dry-blended compound) was discharged from the mixer at a 220° F.–230° F. batch temperature.

b. Pelletizing Process

The powder dry-blended compound was then converted into pellets with the aid of the Kombi-Plast Model KP800 Werner and Pfleiderer Pelletizing system. Machine control conditions were as follows:

| Temperature Zone | Zone Temperature |
|---|---|
| Zone 1 | 230° F. |
| Zone 2 | 230° F. |
| Zone 3 | 230° F. |
| Zone 4 | 180° F. |
| Zone 5 | 180° F. |
| Zone 6 | 240° F. |
| Twin screw speed: | 180 RPM |
| Single screw speed: | Fast |
| Crammer speed: | Adjusted to maintain 60%–70% torque | c. Extrusion Process

Pellets produced were then extruded into a refrigeration door gasket profile. The extruder used was a 3.5 inch (24:1 L/D) NRM machine with a Barr II Screw and Maddox Screw Tip. Machine conditions were as follows:

| Temperature Zone | Actual Machine Temperature |
|---|---|
| Zone 1 | 280° F. |
| Zone 2 | 280° F. |
| Zone 3 | 290° F. |
| Zone 4 | 296° F. |
| Zone 5 | 300° F. |
| Zone 6 | 280° F. |
| Zone 7 | 285° F. |
| Die temperature | 285° F. |
| Melt temperature | 320° F. |
| Pressure (psi) at Zone 6 | 1500 |
| RPM Screw | 50 |
| Line speed (feet/min.) | 45 |
| Screw | Barr II Maddox Tip |
| Screen Pack | 1 (20 mesh), 2(40's mesh) 2(80's mesh) | c. Testing Process

Refrigeration door gasket profiles produced were then evaluated for mar resistance to "soft" pre-painted steel for refrigerators. Procedures used were:

A) Procedure I

Sections (1.5 inch long) of gaskets were placed in contact with pre-painted steel test panels. The applied force on the thin section-top portion of the magnetic sleeve was 0.057 to 0.065 pound per square inch or a section of standard refrigeration magnetized magnet profile 1.5 inches long.

B) Procedure II

One assembly (vinyl gasket on pre-painted steel) was then placed in an oven pre-set at 158° F. Another assembly was placed in 100° F./100% relative humidity chamber. Exposure time was 42 days or continuous exposure. After exposure time, assemblies were removed from test chambers and allowed to stabilize to 70°±2° F.

When assemblies had stabilized to 70°±2° F., the PVC profiles were removed from the test panels. Painted panels were then evaluated for degree of marring created by the PVC extruded profiles. Table Example I gives the results of the test. Results indicate that compound produced per this example when extruded into refrigeration gasket profiles have commercially acceptable non-marring properties to paints.

TABLE EXAMPLE I

| | 158° F. | | 100° F. and 100% R.H. | |
|---|---|---|---|---|
| | Adhesion to Paint | Marring | Adhesion to Paint | Marring |
| 1. Standard Appliance Grade PVC | 2,2,3 | 3,3,3 | 1,1,1 | 1,1,1 |
| 2. Experimental Compound | 0,0,0 | 0,0,0 | 0,0,0 | 0,0,0 |

Key: 0 = None
1 = Slight
2 = Moderate
3 = Bad

Example II

Material compounding, sample preparation and test procedures were identical to example I. The raw materials used were as follows:

| Raw Materials | Parts per Hundred Resin |
|---|---|
| Geon 31 PVC resin | 100.00 |
| Epoxidized Soybean Oil Union Carbide | 20.00 |
| Quantum 9720 Polymeric Plasticizer | 80.00 |
| English Clay Calcium Carbonate | 50.00 |
| Witco Zinc Complex Stabilizer | 1.50 |
| Morton Thiokol Fungicide (SB-1) | 1.54 |
| Color Pigments | 5.53 |
| | 258.57 |

As indicated by the above tabulated test results, Table Example II, if practiced, will produce commercially unacceptable marring of pre-painted steel.

TABLE EXAMPLE II

| | Test Condition 158° F. | | Test Condition 100° F. and 100% Relative Humidity | |
|---|---|---|---|---|
| | Adhesion to Paint | Marring | Adhesion to Paint | Marring |
| 1. Standard Appliance Grade PVC | 2,2,3 | 3,3,3 | 1,1,1 | 1,1,1 |
| 2. Experimental Compound | 3,3,3 | 3,3,3 | 3,3,3 | 3,3,3 |

Key: 0 = None
1 = Slight
2 = Moderate
3 = Bad

Example III

Material compounding, sample preparation and test procedures were identical to Example I. The raw materials used were as follows:

| Raw Materials | Parts per Hundred Resin |
|---|---|
| Geon 31 PVC resin | 100.00 |
| Epoxidized Soybean Oil Union Carbide | 16.00 |
| Quantum 9720 Polymeric Plasticizer | 64.00 |

-continued

| Raw Materials | Parts per Hundred Resin |
|---|---|
| English Clay Calcium Carbonate | 50.00 |
| Witco Zinc Complex Stabilizer | 1.50 |
| Morton Thiokol Fungicide (SB-1) | 1.54 |
| Color Pigments | 5.53 |
| Ethylene Co-polymer | 80.00 |
| | 318.57 |

As shown in Table Example III, results indicate that compound produced according to Example III will produce unacceptable marring of pre-painted steel.

TABLE EXAMPLE III

| | Test Condition 158° F. | | Test Condition 100° F. and 100% Relative Humidity | |
|---|---|---|---|---|
| | Adhesion to Painted Panel | Marring to Paint | Adhesion to Painted Panel | Marring to Paint |
| 1. Standard Appliance Grade PVC | 2,2,3 | 3,3,3 | 1,1,1 | 1,1,1 |
| 2. Experimental Compound | 3,3,3 | 2,2,2 | 3,3,3 | 2,2,2 |

Key: 0 = None
1 = Slight
2 = Moderate
3 = Bad

TABLE I

| Resins Evaluated | Porosity cc/gram | Inherent Viscosity | Procedure I Effect on paint marring at same durometer hardness Scale* 0–10 |
|---|---|---|---|
| Pipe Grade PVC resin | .24 | .92 | 0 |
| Geon 30 | .34 | 1.02 | 3 |
| Geon 31 | .34 | 1.02 | 3 |
| Georgia Gulf 1100 | .34 | 1.02 | 3 |
| PVC Co-polymer | .45 | .99 | 3 |
| Geon 3500 | .45 | 1.34 | 7 |
| Geon 3400 | .47 | 1.34 | 7 |

Scale* 0–10
0 = No improvement to marring.
3 = Improvement was slight.
7 = Improvement was good—indicating the impact of PVC's resin porosity and I.V. on paint marring.

TABLE II

| Blends of resins with different I.V.'s (Inherent Viscosity) evaluated | Ratio Blend | Effect on paint marring at the same durometer hardness Scale* 0–10 |
|---|---|---|
| 1.02 | 100% | 3 |
| 1.02/1.34 | 75%/25% | 4 |
| 1.02/1.34 | 50%/50% | 5 |
| 1.02/1.34 | 25%/75% | 6 |
| 1.34 | 100% | 7 |

Scale* 0–10
0 = No improvement.
10 = No marring to painted appliance test panels.

TABLE IV

| Types Evaluated | Use Level PHr | Effect on marring same durometer hardness formulation Scale* 0–10 |
|---|---|---|
| Stearic Acid | 0–.5 | 0 |
| AC-1702 (Allied) | 0–.5 | 0 |
| AC-6A (Allied) | 0–.5 | 0 |
| CPE (Dow's 3623) | 0–10 | 0 |
| Coupling Agent (Kenrich L-38) | 0–1.39 | 0 |
| Acrylic Modifier (Rohm & Haas 1K–120N) | 0–5 | 0 |
| Lubricant (Loxiol G-70) | 0–2 | 0 |
| Kenamide S Witco Corp. | 0–2 | 0 |
| Dupont Elvaloy 742 | 0–80 | 5 |
| USI's EVA | 0–30 | 10 |
| Emery 3004 Hydrocarbon | 1–3 | 0 |
| Emery 3006 Hydrocarbon | 1–3 | 0 |
| Emery 3008 Hydrocarbon | 1–8 | 0 |

Scale* 0–10
0 = No improvement.
10 = No marring.

TABLE III

| Plasticizer (Polymeric Permanent Type | Acid Type | Glycol Type | Molecular weight (grams/mole) | Effect on marring at same durometer Scale* 0–10 |
|---|---|---|---|---|
| Quantum 9776 | Adipic | 1,3 Butylene | 1500–2000 | 4 |
| Quantum 9789 | Adipic | Propylene | 5000 | 2 |
| Quantum 9720 | Azaleic | Propylene | 500 | 0 |
| Quantum 9752 | Phthlatic | Neopentyl Propylene | 1000–2000 | 0 |
| Quantum 9751 | Ter Phthlatic | Neopentyl Propylene | 1000–2000 | 0 |
| Quantum 9761 | Adipic | 1,3 Butylene | 1500–2000 | 0 |
| Quantum 9755 | Adipic | Neopentyl | 1500–2000 | 6 |
| Quantum 9788 | Sebasic | Propylene | 5000 | 0 |
| C P Hall P550 | Glutaric | | 1500–2000 | 2 |
| Huls 910 | Adipic | Neopentyl | 1500–2000 | 6 |

Scale* 0–10
0 = No improvement.
10 = No marring of appliance painted panels.

What we claim is:

1. A gasketing compound exhibiting low plasticizer migration and low marring effect on painted surfaces comprising:
    (a) a first vinyl chloride resin having an inherent viscosity greater than about 1.02 and a porosity greater than about 0.34 cc/gm;
    (b) a second vinyl chloride resin having an inherent viscosity of at least about 1.02 and a porosity of at least about 0.34 cc/gm, the inherent viscosity differing from the inherent viscosity of said first vinyl chloride resin; and
    (c) from an effective amount up to about 80 parts per 100 parts of resin of an external plasticizer.

2. The gasketing compound of claim 1 wherein said plasticizer is selected from the group consisting of nitrile rubber, ethylene vinyl acetate, urethane, and polyester.

3. The gasketing compound of claim 1 wherein said plasticizer is a polymeric polyester plasticizer.

4. The gasketing compound of claim 3 wherein said plasticizer is a polymeric polyester plasticizer formed from adipic acid and neopentyl glycol, and has an average molecular weight of from about 1500 to about 2000.

5. The gasketing compound of claim 3 wherein said plasticizer is a polymeric polyester plasticizer formed from adipic acid and 1,3-butylene glycol and wherein the polyester plasticizer has a molecular weight of from about 1500 to about 2000.

6. The gasketing compound of claim 3 wherein said plasticizer is a polymeric polyester plasticizer formed from adipic acid and propylene glycol and wherein the polyester plasticizer has a molecular weight of about 5000.

7. The gasketing compound of claim 3 wherein said plasticizer is a polymeric polyester plasticizer formed from glutaric acid and propylene glycol and wherein the polyester plasticizer has a molecular weight of from about 1500 to about 2000.

8. The gasketing compound of claim 1 wherein said first vinyl chloride containing resin has an inherent viscosity of at least 1.34 and a porosity of at least 0.45 cc/gm.

9. A gasketing compound exhibiting low plasticizer migration and low marring effect on painted surfaces manufactured by a process comprising the steps of:
   (a) pelletizing a composition comprising:
      (1) a first vinyl chloride resin having an inherent viscosity greater than about 1.02 and a porosity greater than about 0.34 cc/gm;
      (2) a second vinyl chloride resin having an inherent viscosity of at least about 1.02 and a porosity of at least about 0.34 cc/gm, the inherent viscosity differing from the inherent viscosity of said first vinyl chloride resin; and
      (3) from an effective amount up to about 80 parts per 100 parts of resin of an external plasticizer; and
   (b) extruding said pelletized composition to form a profile that is converted into a complete gasket.

10. The gasketing compound of claim 9 wherein said plasticizer is selected from the group consisting of nitrile rubber, ethylene vinyl acetate, urethane, and polyester.

11. The gasketing compound of claim 9 wherein said plasticizer is a polymeric polyester plasticizer.

12. The gasketing compound of claim 11 wherein said plasticizer is a polymeric polyester plasticizer formed from adipic acid and neopentyl glycol, and has an average molecular weight of from about 1500 to about 2000.

13. The gasketing compound of claim 9 wherein said first vinyl chloride containing resin has an inherent viscosity of at least 1.34 and a porosity of at least 0.45 cc/gm.

* * * * *